Figure 1:
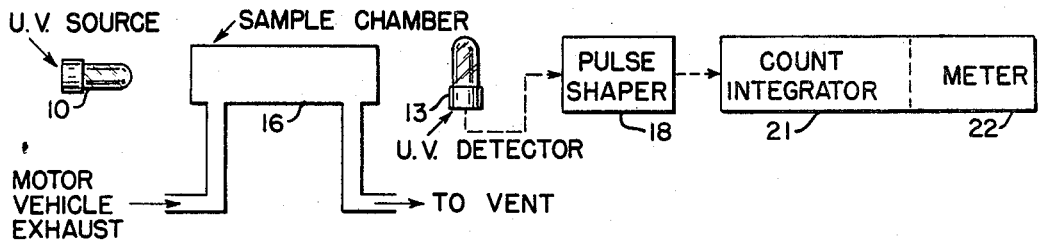

May 21, 1968     D. E. BENZ ET AL     3,384,746
ULTRAVIOLET GAS ANALYSIS APPARATUS AND DETECTOR CIRCUIT
INTEGRATING MEANS HAVING BOTH SHORT AND LONG CONSTANTS
Filed Feb. 2, 1966

INVENTOR.
DONALD E. BENZ
DANIEL A. DOUGHTY
STANLEY J. TIBBETTS

BY
ATTORNEY

United States Patent Office 3,384,746
Patented May 21, 1968

1

3,384,746
ULTRAVIOLET GAS ANALYSIS APPARATUS AND DETECTOR CIRCUIT INTEGRATING MEANS HAVING BOTH SHORT AND LONG CONSTANTS
Donald E. Benz, Minnetonka, Daniel A. Doughty, Plymouth Village, and Stanley J. Tibbetts, Minnetonka, Minn., assignors to Honeywell Inc., Minneapolis, Minn., a corporation of Delaware
Filed Feb. 2, 1966, Ser. No. 524,583
10 Claims. (Cl. 250—43.5)

Our invention is concerned with an improved detecting apparatus and particularly with a detecting apparatus which originates pulses, or counts, of electrical energy, of a random frequency or occurrence upon being subjected to a condition to which the detecting apparatus is sensitive.

In a preferred embodiment of our invention, the detecting apparatus consists basically of an ultraviolet source and an ultraviolet detector which are spaced from each other to define a sample chamber therebetween into which a vapor to be analyzed is introduced. The vapor sample absorbs ultraviolet energy in direct proportion to the concentration of ultraviolet absorbing hydrocarbon in the sample, thus affecting the pulse or count rate of the ultraviolet detector. A high concentration of hydrocarbon absorbs enough of the ultraviolet energy to result in a low count rate; a low concentration of hydrocarbons absorbs less ultraviolet energy, resulting in a high count rate. The ultraviolet emission from the source occurs throughout the range of the detector, which is sensitive only to ultraviolet in a narrow wavelength region where there is high absorption of ultraviolet energy by olefinic and aromatic hydrocarbons, but not by oxygen, water vapor, and other common gases.

The output of the UV detector is applied to a pulse shaper, the output of the pulse shaper consisting of square wave pulses of uniform amplitude and width, the frequency of which is determined by the pulse rate of the UV detector.

A unique integrating means is provided, having a short time constant circuit and a long time constant circuit, the long time constant circuit energizing an electrical energy sensitive output means in the form of a meter, the meter display being proportional to the average number of pulses per second received from the UV detector.

Voltage sensitive means is connected to the short time constant circuit and the long time constant circuit such that upon a step change in pulse rate establishing a given differential in voltage between the two time constant circuits, the voltage sensitive means is effective to cause the meter to quickly indicate a portion of the step change.

The fast response achieved by the detecting apparatus of our invention is of particular utility when our apparatus is utilized to analyze the exhaust gases of a motor vehicle. It has become common practice to analyze the exhaust gases of a motor vehicle under an idle condition, when accelerating, and when decelerating. The time periods of acceleration and deceleration, particularly in a stationary test facility, are of relatively short time duration and it is essential that the analyzing equipment not only accurately read the concentration of unburned hydrocarbons but this reading must be stable and must be achieved in a very short time period.

Referring to the drawing, FIGURE 1 is a diagrammatic showing of our invention, showing the spacial relationship of the UV source, the sample chamber, and the UV detector, and showing in block diagram form the manner in which the electrical signals from the UV detetcor are utilized.

Figure 2:
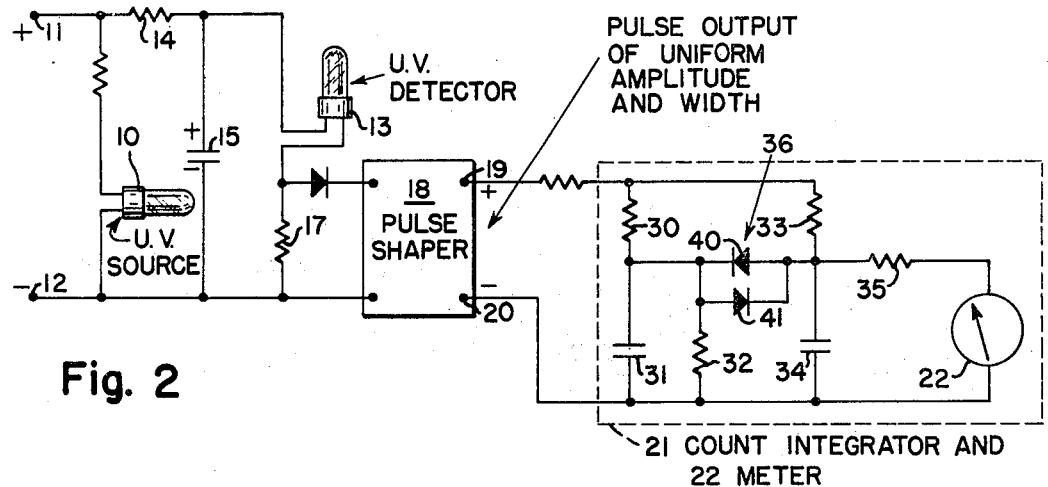

FIGURE 2 is a schematic representation of our invention, showing a unique count integrator having a pair of back-to-back connected diodes, and

2

Figure 3:
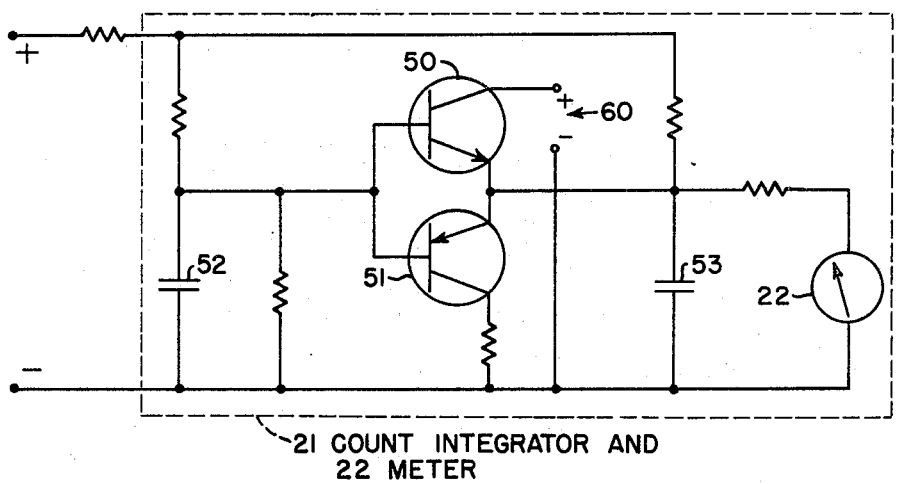

FIGURE 3 is a showing of a modification wherein the count integrator utilizes a pair of transistors whose input circuit are connected in parallel and an opposite control sense.

Referring to the drawing, reference numeral 10 (FIGURES 1 and 2) designates a UV source which is energized from a source of DC voltage, having terminals 11 and 12. Reference numeral 13 designates a UV detector which may be in the form of a Geiger tube. By Geiger tube we mean a detector having a pair of electrodes disposed in an ionizable gas, and in which an electron is liberated upon the presence of radiation, to cause a pulse of current to flow between the electrodes. This UV detector is energized from the source of voltage 11–12.

Reference numeral 16 designates a sample chamber into which a vapor sample is introduced, for example, motor vehicle exhaust to be analyzed for content of unburned hydrocarbons. The quantity of ultraviolet energy which passes through the sample chamber to impinge upon Geiger tube 13 is a measure of the quantity of unburned hydrocarbon in the sample chamber. The presence of ultraviolet energy at Geiger tube 13 causes the Geiger tube to fire in a well-known manner and to provide a pulse of electrical energy across a resistor 17 (FIGURE 2). This pulse of energy, which is a DC pulse, is applied to the input of a pulse shaper 18, this pulse shaper providing a pulse output of uniform amplitude and width at the pulse shaper output terminals 19 and 20. This pulse output is a DC output, terminal 19 being the positive output terminal.

The pulse output 19–20 is applied to the input of a count integrator 21, the output of the count integrator being connected to electrical energy sensitive output means in the form of a meter 22.

Referring specifically to the count integrator of FIGURE 2, a resistor 30 and a capacitor 31 comprise first electrical energy integrating means especially constructed to have a short time constant. For example, resistor 30 may be 330 ohms, capacitor 31, 500 microfarads, and a further resistor 32 connected in parallel with capacitor 31 may be 680 ohms. A resistor 33 and a capacitor 34 comprise second electrical energy integrating means especially constructed to have a long time constant. For example, resistor 33 may be a 10,000 ohm resistor and capacitor 34 a 500 microfarad capacitor. Connected in parallel with capacitor 34 is a meter 22 which may be a 100 microamp meter and a resistor 35, which may be an 18,000 ohm resistor.

In selecting component values for the count integrator 21 and meter 22, the ratio of the resistance values of resistor 30 divided by resistor 32 should equal resistor 33 divided by the sum of resistor 35 and meter 22. A like consideration applies to FIGURE 3.

Reference numeral 36 identifies generally electrical energy sensitive means which is connected to the capacitors 31 and 34 of the first and second integrating means to be sensitive to a differential in energy stored therein such that when this differential is above a given value, means 36 is effective to quickly modify the energy stored in the second capacitor 34 until such time as the differential is reduced to the given value. This is the manner in which we provide fast response of meter 22.

Specifically, the electrical energy sensitive means 36 of FIGURE 2 is a pair of back-to-back connected diodes 40 and 41. If a step change in hydrocarbon concentration in sample chamber 16 occurs, such that more unburned hydrocarbons are present in the motor vehicle exhaust, then the count rate of Geiger tube 13 decreases and the short time constant integrating means 30–31 quickly follows this reduction in count rate. As a result, the upper plate of capacitor 31 becomes negative with respect to the upper plate of capacitor 34 and diode 40 is conductive to quickly discharge capacitor 34 until the differential has been reduced to a given value where diode 40 is no longer conductive. If a step change of the opposite sense occurs, then diode 41 is rendered conductive to charge capacitor 34. In either event, the change in voltage on capacitor 31 is quickly accomplished in a manner which is related to the short time constant of network 30–31.

In selecting the time duration of the short time constant, consideration must be given to the threshold at which one of the diodes 40 or 41 will fire. The time constant should be short enough to cause firing of a diode when the average value of voltage 19–20 changes. However, the time constant should not be so short that a change in pulse frequency, which does not change the average value of voltage 19–20, will cause a diode to fire.

In FIGURE 3, we disclose a modified electrical energy sensitive means including a pair of transistors 50 and 51, the base-to-emitter circuits of these transistors being parallel connected, but in opposite control sense, to the integrating capacitors 52 and 53. Here again, capacitor 52 is in a short time constant circuit and capacitor 53 is in a long time constant circuit.

The differential in voltage which controlled the firing of diodes 40 and 41 of FIGURE 2 is effective to control transistors 50 and 51 of FIGURE 3 by virtue of the effective diodes represented by the base-to-emitter circuits of these transistors.

The above described differentials, which are established due to a step change in hydrocarbon concentration in sample chamber 16, are effective to render one or the other of transistors 50 and 51 conductive. If transistor 50 is rendered conductive, then the emitter-to-collector circuit of this transistor (the output circuit) is effective to charge capacitor 53 from a source of DC voltage 60. If the differential is such that transistor 51 is rendered conductive, then capacitor 53 discharges through the emitter-to-collector circuit of this transistor.

In either the contruction of FIGURE 2 or 3, the electrical energy sensing means is effective to quickly modify the energy stored in the integrating capacitor of the long time constant circuit, until such time as the differential is reduced to a given value. Thus, a change in meter reading at meter 22 is quickly accomplished. Furthermore, the meter display is steady and easily readable.

We claim as our invention:

1. In combination with detector means which originates pulses of electrical enery upon being subjected to a condition to which the detector means is sensitive,
   first electrical energy integrating means connected to said detector means and having first electrical energy storage means, said first integrating means having a short time constant,
   second electrical energy integrating means connected to said detector means and having second electrical energy storage means, said second integrating means having a long time constant,
   electrical energy sensitive output means connected to said second storage means,
   and electrical energy sensitive means connected between said first and second storage means to be sensitive to a differential in energy stored therein which is above a given value and to then quickly modify the energy stored in said second storage means until said differential is reduced to said given value.

2. The combination as defined in claim 1 wherein said pulses of electrical energy are direct current pulses and said first and second electrical energy storage means are capacitor means.

3. The combination as defined in claim 2 wherein said electrical energy sensitive means is voltage sensitive bi-directional current conductive means to modify the energy stored in said second storage means in accordance with said short time constant until said differential is reduced to said given value.

4. The combination as defined in claim 1 wherein the detector means includes an ultraviolet source and a Geiger tube spaced from each other to define a sample chamber therebetween, said sample chamber being adapted to receive a vapor having an unknown ultraviolet absorption characteristic.

5. The combination is defined in claim 4 wherein said sample chamber is adapted to receive motor vehicle exhaust and said output means is a meter to provide an indication related to the concentration of unburned hydrocarbons.

6. The combination as defined in claim 3 wherein said electrical energy sensitive means is a pair of back-to-back connected diodes.

7. The combination as defined in claim 3 wherein said electrical energy sensitive means is a pair of transistors having their input circuits parallel connected in opposite control sense to said first and second capacitive means such that one or the other of said transistors is rendered conductive, dependent upon the sense of said differential in energy, and having their output circuits connected to said second capacitive means to quickly modify the energy stored therein upon one or the other of said transistors being rendered conductive.

8. The combination as defined in claim 1 wherein the detector means includes a UV source and a Geiger tube spaced from each other to define a sample chamber therebetween, said sample chamber being adapted to receive motor vehicle exhaust, wherein said pulse of electrical energy are DC pulses, wherein said first and second electrical energy storage means are capacitive means, wherein said electrical energy sensitive means is a pair of back-to-back connected diodes connected to said first and second capacitive means to be selectively current conductive to quickly modify the energy stored in said second storage means until said differential is reduced to said given value, and wherein said output means is a DC meter.

9. The combination as defined in claim 6 wherein said electrical energy sensitive means is a pair of back-to-back connected diodes connected to said first and second capacitive means to be selectively current conductive to quickly modify the energy stored in said second storage means until said differential is reduced to said given value.

10. The combination as defined in claim 6 wherein said electrical energy sensitive means is a pair of transistors having their input circuits parallel connected in opposite control sense to said first and second capacitive means such that one or the other of said transistors is rendered conductive, dependent upon the sense of said differential in energy, and having their output circuits connected to said second capacitive means to quickly modify the energy stored therein upon one or the other of said transistors being rendered conductive.

No references cited.

RALPH G. NILSON, *Primary Examiner.*

A. L. BIRCH, *Assistant Examiner.*